United States Patent
Bidkar et al.

(10) Patent No.: US 9,255,642 B2
(45) Date of Patent: Feb. 9, 2016

(54) AERODYNAMIC SEALS FOR ROTARY MACHINE

(75) Inventors: Rahul Anil Bidkar, Niskayuna, NY (US); Massimiliano Cirri, Munich (DE); Azam Mihir Thatte, Rotterdam, NY (US); John Robert Williams, Fairfield, OH (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 13/542,780

(22) Filed: Jul. 6, 2012

(65) Prior Publication Data
US 2014/0008871 A1     Jan. 9, 2014

(51) Int. Cl.
| | |
|---|---|
| F01D 11/06 | (2006.01) |
| F16J 15/447 | (2006.01) |
| F01D 11/02 | (2006.01) |
| F01D 11/04 | (2006.01) |
| F16J 15/44 | (2006.01) |
| F04D 29/16 | (2006.01) |

(Continued)

(52) U.S. Cl.
CPC ............. *F16J 15/447* (2013.01); *F01D 11/025* (2013.01); *F01D 11/04* (2013.01); *F04D 29/164* (2013.01); *F04D 29/526* (2013.01); *F16J 15/442* (2013.01); *F16J 15/445* (2013.01); *F01D 11/14* (2013.01)

(58) Field of Classification Search
CPC ........ F01D 11/025; F01D 11/04; F01D 11/14
USPC ........ 415/110, 111, 113, 173.2, 173.5, 174.1, 415/174.2, 174.5, 230–231; 277/409, 411, 277/412, 413, 416, 421
See application file for complete search history.

(56) References Cited

U.S. PATENT DOCUMENTS

| | | |
|---|---|---|
| 3,051,497 A | 8/1962 | Wigg et al. |
| 3,809,443 A | 5/1974 | Cherubim |
| 4,212,475 A | 7/1980 | Sedy |

(Continued)

FOREIGN PATENT DOCUMENTS

| | | |
|---|---|---|
| AU | 2005201225 A1 | 10/2005 |
| CN | 1371456 A | 9/2002 |

(Continued)

OTHER PUBLICATIONS

R. A. Shellef & R. P. Johnson, "A Bi-Directional Gas Face Seal", Tribology Transactions, vol. 35, Issue 1,1992, pp. 53-58.

(Continued)

*Primary Examiner* — Gilbert Lee
*Assistant Examiner* — Thomas Neubauer
(74) *Attorney, Agent, or Firm* — John P. Darling (57) ABSTRACT

An aerodynamic seal assembly for a rotary machine includes multiple sealing device segments disposed circumferentially intermediate to a stationary housing and a rotor. Each of the segments includes a shoe plate with a forward-shoe section and an aft-shoe section having multiple labyrinth teeth therebetween facing the rotor. The sealing device segment also includes multiple flexures connected to the shoe plate and to a top interface element, wherein the multiple flexures are configured to allow the high pressure fluid to occupy a forward cavity and the low pressure fluid to occupy an aft cavity. Further, the sealing device segments include a secondary seal attached to the top interface element at one first end and positioned about the flexures and the shoe plate at one second end.

19 Claims, 6 Drawing Sheets

(51) Int. Cl.
*F04D 29/52* (2006.01)
*F01D 11/14* (2006.01)

(56) References Cited

U.S. PATENT DOCUMENTS

| | | | |
|---|---|---|---|
| 4,223,958 A | 9/1980 | Gray | |
| 5,100,158 A | 3/1992 | Gardner | |
| 5,370,402 A | 12/1994 | Gardner et al. | |
| 5,427,455 A | 6/1995 | Bosley | |
| 5,632,493 A | 5/1997 | Gardner | |
| 5,791,868 A | 8/1998 | Bosley et al. | |
| 5,833,369 A | 11/1998 | Heshmat | |
| 5,902,049 A | 5/1999 | Heshmat | |
| 6,505,837 B1 | 1/2003 | Heshmat | |
| 6,527,274 B2 | 3/2003 | Herron et al. | |
| 6,655,696 B1* | 12/2003 | Fang et al. | 277/409 |
| 6,746,019 B1 | 6/2004 | Liebenberg et al. | |
| 7,044,470 B2 | 5/2006 | Zheng | |
| RE39,190 E* | 7/2006 | Weissert | 384/104 |
| 7,261,300 B2 | 8/2007 | Agrawal et al. | |
| 7,435,049 B2* | 10/2008 | Ghasripoor et al. | 415/173.3 |
| 8,074,997 B2 | 12/2011 | Garrison et al. | |
| 8,172,232 B2 | 5/2012 | Justak | |
| 9,145,785 B2* | 9/2015 | Bidkar | F01D 11/04 |
| 2003/0071422 A1 | 4/2003 | Holder | |
| 2006/0067815 A1 | 3/2006 | Ghasripoor et al. | |
| 2008/0003099 A1 | 1/2008 | Giesler et al. | |
| 2009/0058013 A1* | 3/2009 | Bulgrin et al. | 277/419 |
| 2009/0297341 A1* | 12/2009 | Turnquist et al. | 415/173.3 |
| 2011/0304101 A1* | 12/2011 | Grondahl et al. | 277/411 |
| 2012/0223483 A1* | 9/2012 | Bidkar et al. | 277/301 |
| 2014/0008871 A1 | 1/2014 | Bidkar et al. | |
| 2014/0062024 A1 | 3/2014 | Bidkar et al. | |
| 2014/0117624 A1 | 5/2014 | Bidkar et al. | |
| 2014/0119912 A1 | 5/2014 | Bidkar et al. | |

FOREIGN PATENT DOCUMENTS

| | | |
|---|---|---|
| CN | 1769653 A | 5/2006 |
| CN | 101297140 A | 10/2008 |
| EP | 1582700 A2 | 10/2005 |
| EP | 1835163 A1 | 9/2007 |
| EP | 2495398 A2 | 9/2012 |
| GB | 652109 A | 4/1951 |
| GB | 2450213 A | 12/2008 |
| JP | 62218889 A | 9/1987 |
| JP | 62243901 A | 10/1987 |

OTHER PUBLICATIONS

Steinetz et al., "Advanced Seal Technology Role in Meeting Next Generation Turbine Engine Goals", National Aeronautics and Space Administration/TM-1998-206961, 14 Pages.

European Search Report and Written Opinion issued in connection with corresponding EP Application No. 13166132.4-1610 dated Oct. 24, 2013.

U.S. Appl. No. 14/0769,46, filed Nov. 11, 2013, Zheng et al.
U.S. Appl. No. 14/226,583, filed Mar. 26, 2014, Thatte et al.
U.S. Appl. No. 14/076,974, filed Nov. 11, 2013, Sha et al.
U.S. Appl. No. 14/076,982, filed Nov. 11, 2013, Zheng et al.
U.S. Appl. No. 14/226,617, filed Mar. 26, 2014, Thatte at al.
U.S. Appl. No. 14/037,790, filed Mar. 26, 2013, Bidkar et al.
U.S. Appl. No. 14/325,452, filed Aug. 7, 2004, Bidkar et al.

Unofficial English translation of Chinese Office Action issued in connection with corresponding CN Application No. 201310161985.1 on Sep. 14, 2015.

\* cited by examiner

Axial direction →

100. Disposing a plurality of sealing device segments intermediate to the stationary housing and the rotatable element, wherein each of the sealing device segments comprise a shoe plate having a plurality of labyrinth teeth between a forward shoe plate section and an aft shoe plate section — 102

Attaching a plurality of bellow springs in each of the sealing device segments to the shoe plate and to a top interface element — 104

Disposing a secondary seal within each of the sealing device segment to form a forward cavity and an aft cavity, wherein the secondary seal is attached to the top interface element via a cantilever beam section at one first end and positioned about the plurality of bellow springs and the shoe plate at one second end — 106

AERODYNAMIC SEALS FOR ROTARY MACHINE

STATEMENT REGARDING FEDERALLY SPONSORED RESEARCH & DEVELOPMENT

This invention was made with partial Government support under contract number DE-FC26-05NT42643 awarded by U.S. Department of Energy. The Government has certain rights in the invention.

BACKGROUND

The present application relates generally to seal assemblies for turbo-machinery and more particularly relates to advanced aerodynamic seal assemblies for sealing rotor/stator gaps and the like.

Various types of turbo-machinery, such as gas turbine engines, aircraft engines and steam turbines, are known and widely used for power generation, propulsion, and the like. The efficiency of the turbo-machinery depends in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps from regions of high pressure to regions of low pressure may result in poor efficiency for the turbo-machinery. Such leakage may impact efficiency in that the leaked fluids fail to perform useful work.

Different types of sealing systems are used to minimize the leakage of fluid flowing through turbo-machinery. The sealing systems, however, often are subject to relatively high temperatures, thermal gradients, and thermal and mechanical expansion and contraction during various operational stages that may increase or decrease the clearance therethrough. For example, traditional labyrinth seals that are assembled to run very tight clearance during start-up transient phase might run with large clearances during steady state operations, thereby leading to poor performance at steady state operation.

There is therefore a desire for improved compliant sealing assemblies for use with turbo-machinery. Preferably such compliant sealing assemblies may provide tighter sealing during steady state operations while avoiding rubbing, wear caused by contact and damage during transient operations. Such sealing assemblies should improve overall system efficiency while being inexpensive to fabricate and providing an increased life for the associated parts.

BRIEF DESCRIPTION

In accordance with an embodiment of the invention, an aerodynamic seal assembly for a rotary machine is provided. The assembly includes multiple sealing device segments disposed circumferentially intermediate to a stationary housing and a rotor. Each of the segments includes a shoe plate with a forward-shoe section and an aft-shoe section having multiple labyrinth teeth therebetween facing the rotor. The shoe plate is configured to allow a high pressure fluid to a front portion of the plurality of labyrinth teeth and a low pressure fluid behind the plurality of the labyrinth teeth and further configured to generate an aerodynamic force between the shoe plate and the rotor. The sealing device segment also includes multiple bellow springs or flexures connected to the shoe plate and to a top interface element, wherein the multiple bellow springs or flexures are configured to allow the high pressure fluid to occupy a forward cavity and the low pressure fluid to occupy an aft cavity. Further, the sealing device segments include a secondary seal attached to the top interface element at one first end and positioned about the multiple bellow springs or flexures and the shoe plate at one second end.

In accordance with an embodiment of the invention, an aerodynamic sealing device for turbine components is provided. The sealing device includes a shoe plate having multiple labyrinth teeth between a forward shoe plate section and an aft shoe plate section facing a rotatable element. The shoe plate is configured to allow a high pressure fluid to a front portion of the plurality of the labyrinth teeth and a low pressure fluid behind the plurality of the labyrinth teeth and further configured to generate an aerodynamic force between the shoe plate and the rotor. The sealing device also includes multiple bellow springs or flexures connected to the shoe plate and to a top interface element, wherein the plurality of bellow springs or flexures are configured to allow the high pressure fluid to occupy a forward cavity and the low pressure fluid to occupy an aft cavity. Further, the sealing device includes a secondary seal connected to the top interface element at one first end and positioned about the plurality of bellow springs or flexures and the shoe plate at one second end, wherein the secondary seal disposed within the sealing device is configured to form the forward cavity and the aft cavity towards a high pressure side and a low pressure side of the rotary machine.

In accordance with an embodiment of the invention, a method of forming a gas path seal between a stationary housing of a rotary machine and a rotatable element turning about an axis of the rotary machine is provided. The method includes disposing multiple sealing device segments intermediate to the stationary housing and the rotatable element. Each of the sealing device segments comprises a shoe plate having a plurality of labyrinth teeth between a forward shoe plate section and an aft shoe plate section configured for allowing a high pressure fluid to a front portion of the plurality of the labyrinth teeth and a low pressure fluid behind the plurality of the labyrinth teeth and further configured for generating an aerodynamic force between the shoe plate and the rotor. The method also includes attaching multiple bellow springs or flexures in each of the sealing device segments to the shoe plate and to a top interface element, wherein the plurality of bellow springs or flexures are configured for allowing the high pressure fluid to occupy a forward cavity and the low pressure fluid to occupy an aft cavity. Further, the method includes disposing a secondary seal within each of the sealing device segment to form the forward cavity and the aft cavity, wherein the secondary seal is attached to the top interface element at one first end and positioned about the plurality of bellow springs or flexures and the shoe plate at one second end.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
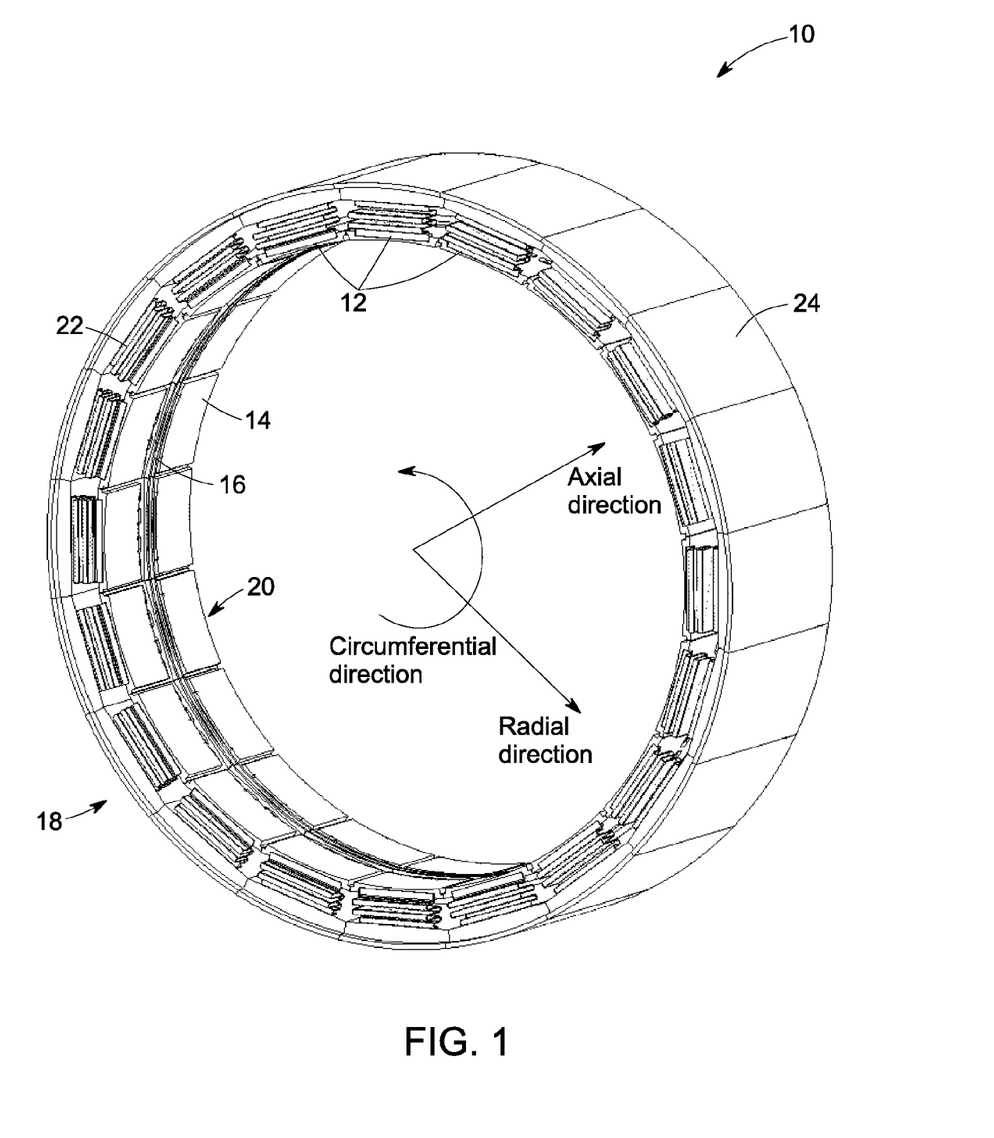
FIG. 1 is a perspective view of an aerodynamic seal assembly for a rotary machine in accordance with an embodiment of the present invention.

FIG. 1 is a perspective view of an aerodynamic seal assembly 10 for a rotary machine in accordance with an embodiment of the present invention. The aerodynamic seal assembly 10 is circumferentially arranged around a rotor shaft (not shown) such that the seal assembly 10 is intermediate to a stationary housing (not shown) and the rotor shaft. The seal assembly 10 includes multiple sealing device segments 12 located adjacent to each other to form the seal assembly 10. Each of the sealing device segment 12 includes a shoe plate 14 located proximate to the rotor shaft. During operation of the rotary machine, the shoe plate 14 rides on an aerodynamic fluid film above the rotor shaft. The seal assembly 10 also includes multiple labyrinth teeth 16 located on the shoe plate 14 at a side facing the rotor shaft surface. The labyrinth teeth substantially separate fluids from a high pressure region 18 from a low pressure region 20 on either sides of the aerodynamic seal assembly 10 of the rotary machine. The seal assembly 10 also includes multiple bellow springs 22 attached to the shoe plate 14 and a top interface element 24. Each of the sealing device segments 12 are assembled relative to the rotor such that there is a clearance gap between each shoe plate 14 and the rotor shaft. The adjacent sealing device segments 12 also include a clearance gap between them. Each of the sealing device segments 12 is described in details in FIG. 2.

Figure 2:
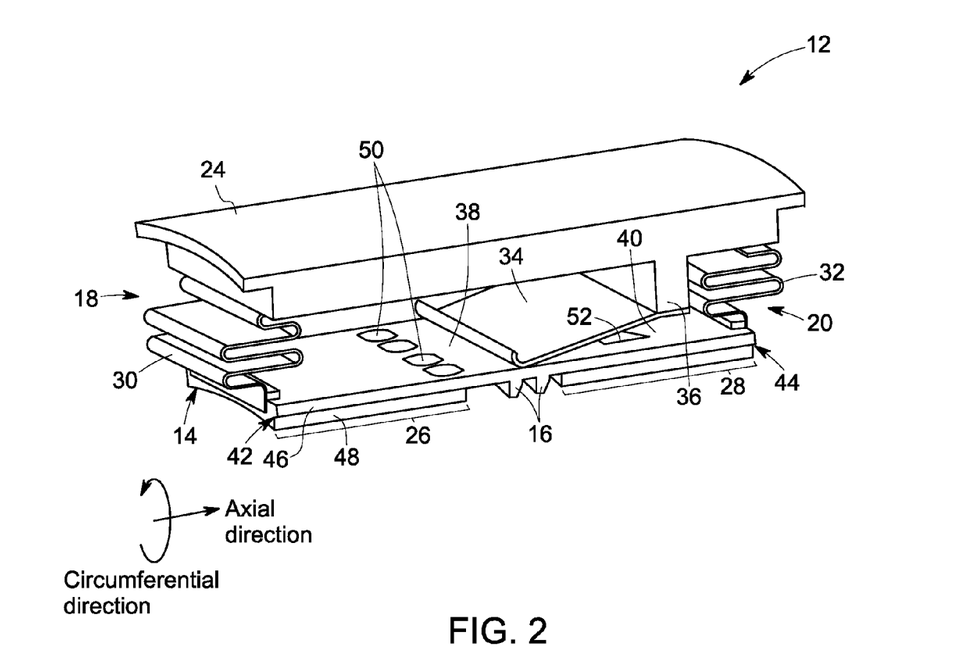
FIG. 2 is a perspective view of a sealing device segment in accordance with an embodiment of the present invention.

FIG. 2 is a perspective view of the sealing device segment 12 in accordance with an embodiment of the present invention. As shown, the sealing device segment 12 includes the shoe plate 14 with a forward shoe section 26 and an aft-shoe section 28 having the multiple labyrinth teeth 16 therebetween facing the rotor shaft (not shown). The sealing device segment 12 includes one or more bellow springs that comprises of a forward bellow spring 30 and an aft bellow spring 32. The sealing device segment 12 further includes a secondary seal 34 attached to the top interface element 24 via a cantilever beam section 36 at one first end and positioned about the plurality of bellow springs 30, 32 and the shoe plate 14 at one second end, wherein each of the secondary seal 34 forms a line contact with the shoe plate 14 at the one second end. In one embodiment, the secondary seal 34 may be directly attached to the top interface element 24. As shown in this embodiment, the bellow springs 30, 32 and the secondary seal 34 are straight in the circumferential direction. The straight bellows springs 30, 32 and the straight secondary seal 34 allow the mechanical stresses to remain low. In another embodiment, the bellow springs 30, 32 and the secondary seal 34 may be curved in the circumferential direction.

In the seal assembly 10 (as shown in FIG. 1), the secondary seals 12 from neighboring sealing device segments 12 form a resistance path for a flow of fluid between the top interface element 24 and the shoe plate 14. In one embodiment, the forward bellow spring 30 and the aft bellow spring 32 are located symmetrically on either side of the line of contact between the secondary seal 34 and the shoe plate 14. This symmetric arrangement allows the shoe plate 14 to translate radially with minimum tilt (edge of the forward shoe section 26 closer to the rotor than the edge of the aft shoe section 28 or vice versa). The reduced tilt caused by the symmetric design also ensures that the shoe plate 14 can travel large displacements both radially inwards and radially outwards (during rotor growth events) in a robust manner.

There exists a small leakage past the line of contact between the secondary seal 34 and the shoe plate 14. The secondary seal 34 is configured to partition the sealing device segment 12 into a forward cavity 38 towards the high pressure side 18 and an aft cavity 40 towards the low pressure side 20 of the rotary machine.

Figure 3:
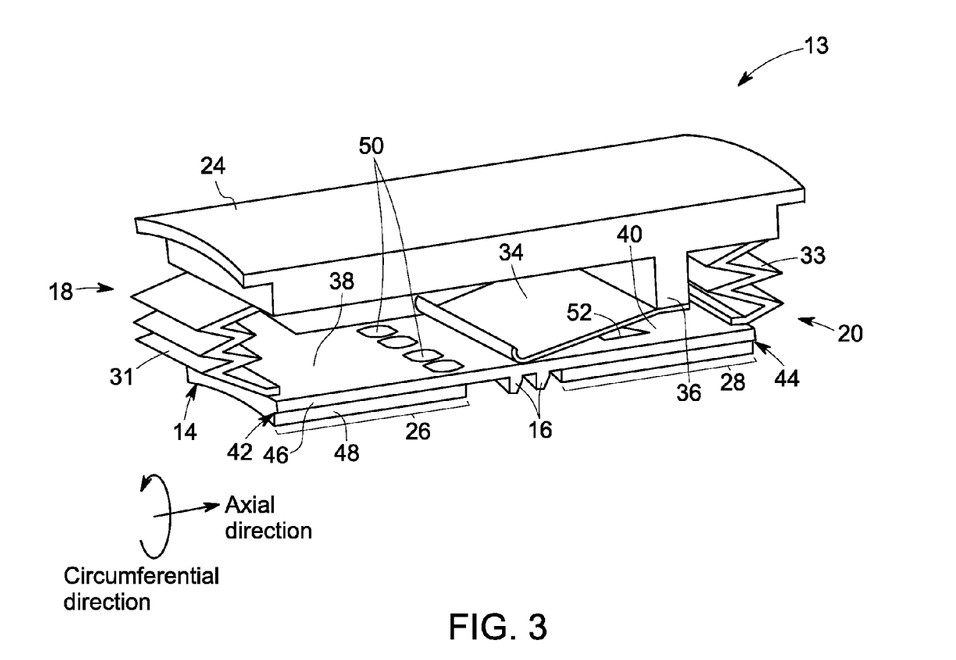
FIG. 3 is a perspective view of a sealing device segment with flexures in accordance with another embodiment of the present invention.

In one embodiment as shown in FIG. 3 a sealing device segment 13 includes multiple flexures 31, 33 connected to the shoe plate 14 and the top interface element 24. Each of the multiple flexures 31, 33 of FIG. 3 or the bellow springs 30, 32 of FIG. 2 comprise of a circumferential width less than each of the circumferential widths of the top interface element 24 and the shoe plate 14. This ensures that upon pressurization of the rotary machine, the fluid flows around the forward bellow spring 30 or the flexure 31 and pressurizes the forward cavity 38. Similarly, at the low pressure side 20 of the rotary machine, the low pressure fluid flows around the aft bellow spring 32 or the flexure 33 to create a low pressure behind the secondary seal 34 within the aft cavity 40.

Further, in one embodiment of FIG. 2, the sealing device segment 12 includes forward shoe feeding grooves 42 and aft shoe feeding grooves 44 at sides of the shoe plate 14 towards a high pressure side 18 and a low pressure side 20 of the rotary machine respectively. A top portion 46 of the shoe plate 14 includes a circumferential width that is wider than a bottom portion 48 forming the feeding grooves 42, 44. Between adjacent sealing device segments 12 in the seal assembly 10 (as shown in FIG. 1), there exists a clearance gap between the adjacent secondary seals 36. In addition to the clearance gap, there are radial gaps as discussed in FIG. 4.

Figure 4:
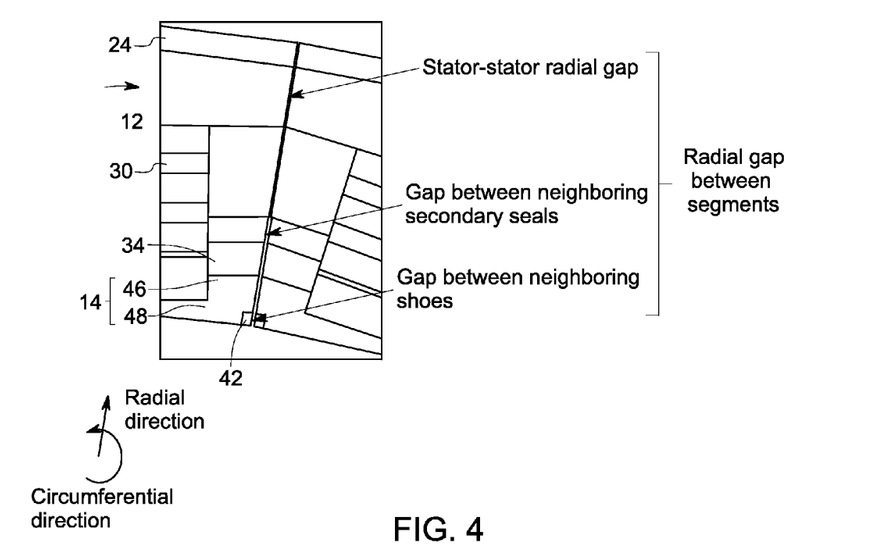
FIG. 4 is a front view of portion of an aerodynamic seal assembly in accordance with an embodiment of the present invention.

FIG. 4 is a portion of the seal assembly 10 (as shown in FIG. 1) that shows radial gaps between adjacent sealing device segments 12 (as shown in FIG. 1). As shown, the top interface elements 24 for a part of the stator housing and has a stator-stator radial gap between adjacent sealing device segments 12. The adjacent secondary seals 34 also reveal a radial gap. Moreover, in the forward shoe section 26 (as shown in FIG. 2), the top portion 46 and the bottom portion 48 of the shoe plate 14 form the forward shoe feeding groove 42. The multiple labyrinth teeth of neighboring shoes form the segment gap between neighboring shoes. In seal assembly 10, the segment radial gaps between neighboring shoe plates 14 and neighboring secondary seals 34 are designed so that the radial motion of the sealing device segments 12 towards the rotor and any circumferential thermal expansion of the segments 12 does not cause segment binding.

As shown in FIG. 2, the shoe plate 14 also includes multiple forward ports 50 located before the line contact at the high pressure side 18 of the rotary machine for allowing an axial flow of a fluid to a front portion of the multiple labyrinth teeth 16. Further, the shoe plate 14 includes one or more aft ports 52 located after the line contact at a low pressure side 20 of the rotary machine. In one embodiment, the one or more aft ports 52 are angled in a circumferential direction to impart a tangential flow to a fluid flowing from behind the multiple labyrinth teeth 16 into the aft cavity 40. In another embodiment, the one or more aft ports 52 are straight ports or circumferential angled ports for allowing the flow of fluid from behind the labyrinth teeth 16 to the aft cavity 40 of the sealing device segment 12.

Figure 5:
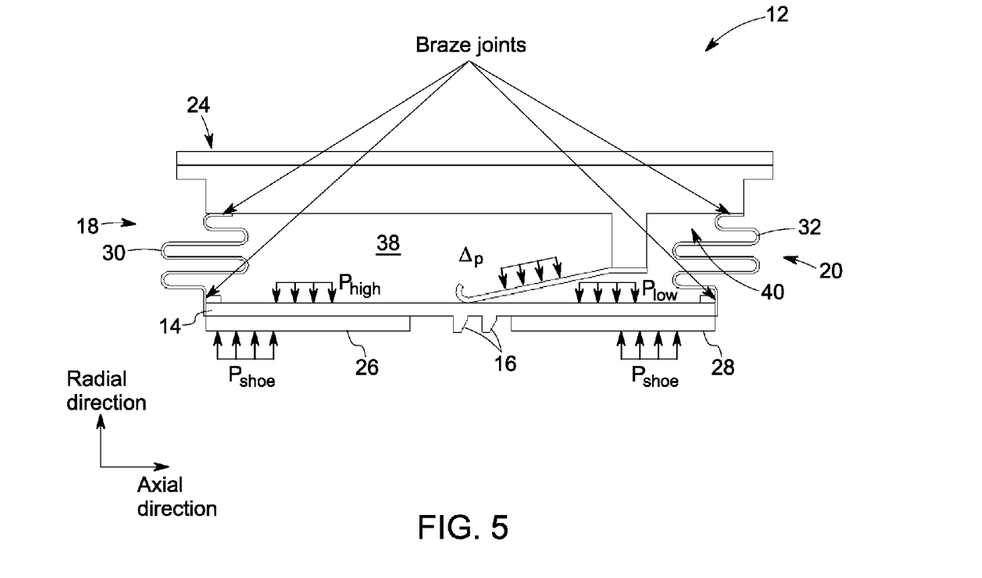
FIG. 5 is a side view of a sealing device segment in accordance with an embodiment of the present invention.

FIG. 5 is a side view of the sealing device segment 12 in accordance with an embodiment of the present invention. As shown in one embodiment, the forward bellow spring 30 and aft bellow spring 32 are connected to the top interface element 24 and the shoe plate 14 by braze joints. FIG. 5 also shows various pressure forces acting on the shoe plate 14 and the secondary seal 34. In the forward cavity 38 and the aft cavity 40, the pressurization of the sealing device segment 12 causes the shoe plate 14 to move towards the rotor during start-up operation of the rotary machine. In a non-limiting example, the shoe plate 14 may ride on a fluid film in an aerostatic mode of operation, which fluid film thickness may range from about $3/1000$ inches to $5/1000$ inches depending on an initial seal assembly clearance with the rotor.

In the aerostatic operation mode, the pressurization causes the secondary seal 34 to deflect radially inwards pushing the shoe plate 14 towards the rotor. While the secondary seal 34 pushes the shoe plate 14 towards the rotor, the bellows springs 30, 32 support and guide the motion of the shoe plate 14. Apart from secondary seal contact force and bellow spring forces, the shoe plate 14 is also subjected to aerostatic pressure loads. These aerostatic pressure loads are caused by the presence of fluid around the shoe plate 14. As shown in the radially outer face of FIG. 5, the shoe plate 14 is subjected to high pressure and low pressure fluid on either side of the secondary seal line contact between the secondary seal 34 and the shoe plate 14.

In one embodiment, the forward ports 50 and the two forward shoe feeding grooves 42 (as shown in FIG. 2, FIG. 3) bring the high pressure fluid from the forward cavity 38 to a front side of the multiple labyrinth teeth 16. Similarly, the one or more aft ports 52 and the aft shoe feeding grooves 44 (as show in FIG. 2, FIG. 3) bring a low pressure fluid from the aft cavity 40 to a back side of the multiple labyrinth teeth 16. Thus the multiple labyrinth teeth 16 are subjected to the pressure drop across the sealing device segment 12 and perform the function of providing the flow restriction for leakage along the rotor-shoe plate gap. Due to the presence of the forward ports 50, all faces of the shoe plate 14 upstream of the secondary seal 34 are subjected to a high pressure fluid. Similarly, the one or more aft ports 52 ensure that all faces of the shoe plate 14 downstream of the secondary seal 34 are subjected to low pressure fluid. When the fluid film thickness is $3/1000$ to $5/1000$ inches or larger between the shoe plate 14 and the rotor surface, the rotation of the rotor does not cause the fluid film pressure beneath the shoe plate 14 to be significantly different from the high and low pressures caused by the forward ports 50 and the aft ports 52. As a consequence, the net fluid load on the shoe plate 14 is approximately zero. The shoe plate 14 moves radially inwards under the influence of an almost zero net fluid load, a secondary seal contact force pushing the shoe plate 14 inwards, and the bellow springs supporting it against this radially inwards motion.

Figure 6:
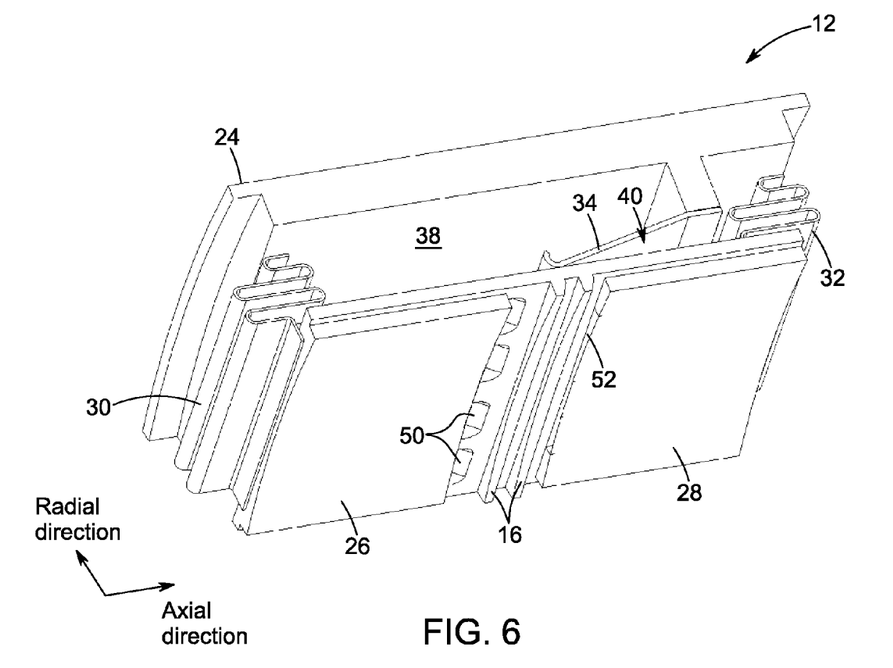
FIG. 6 is a bottom view of a sealing device segment in accordance with an embodiment of the present invention.
Figure 7:
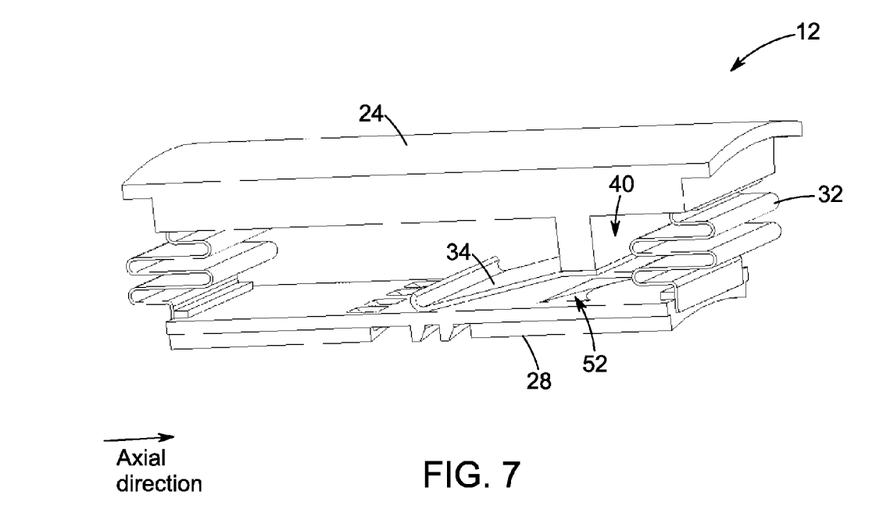
FIG. 7 shows an aft port in a sealing device segment in accordance with an embodiment of the present invention.

FIG. 6 is a bottom view of a sealing device segment 12 in accordance with an embodiment of the present invention. In this embodiment, the sealing device segments 12 show the forward ports 50 that includes four ports. In other embodiments, the forward ports 50 may be fewer ports or more than four ports. In the current embodiment, the forward ports 50 are configured to allow the fluid to flow from the forward ports 50 to the front of the multiple labyrinth teeth 16 in an axial direction. In another embodiment, the forward ports 50 are angled in a circumferential direction to impart the fluid to swirl (gain tangential velocity) as the fluid flows from a forward cavity 38 to a front portion of the multiple labyrinth teeth 16. In this embodiment, one first end of the aft port 52 is shown from a bottom view of the sealing device segment 12. The aft port 52 connects the backside of the labyrinth teeth 16 to the aft cavity 40. As shown, one first end opening of the aft port 52 is located at a first edge of the aft shoe section 28 facing the backside of the labyrinth teeth 16. One second end opening of the aft port 52 in the aft cavity 40 is shown in FIG. 7. In one embodiment, the aft port 52 may be split into more ports. In a further embodiment, the one or more aft ports 52 are angled in a circumferential direction to impart a tangential flow to a fluid flowing from behind the multiple labyrinth teeth 16 into the aft cavity 40.

Figure 8:
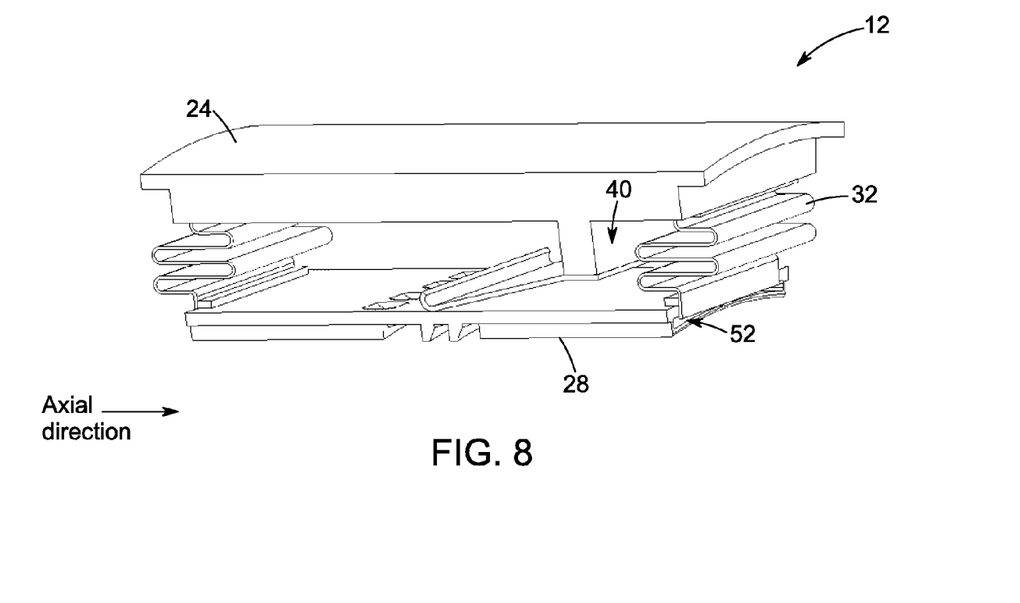
FIG. 8 shows another aft port in a sealing device segment in accordance with an embodiment of the present invention.

FIG. 8 shows another aft port 52 in a sealing device segment 12 in accordance with an embodiment of the present invention. In this embodiment, the one or more aft ports 52 are straight ports or circumferential angled ports for allowing a flow of fluid from behind the multiple labyrinth teeth 16 directly to a downstream cavity of the sealing device segment 12. The first end opening of the one or more aft ports 52 may be located at the first edge of the aft shoe section 28 facing the backside of the labyrinth teeth 16. As shown in this embodiment, the second end opening of the one or more aft ports 52 may be located at a second edge of the aft shoe section of the shoe plate 14 directing the flow of fluid from behind the multiple labyrinth teeth 16 directly to a downstream cavity of the sealing device segment 12.

Figure 9:
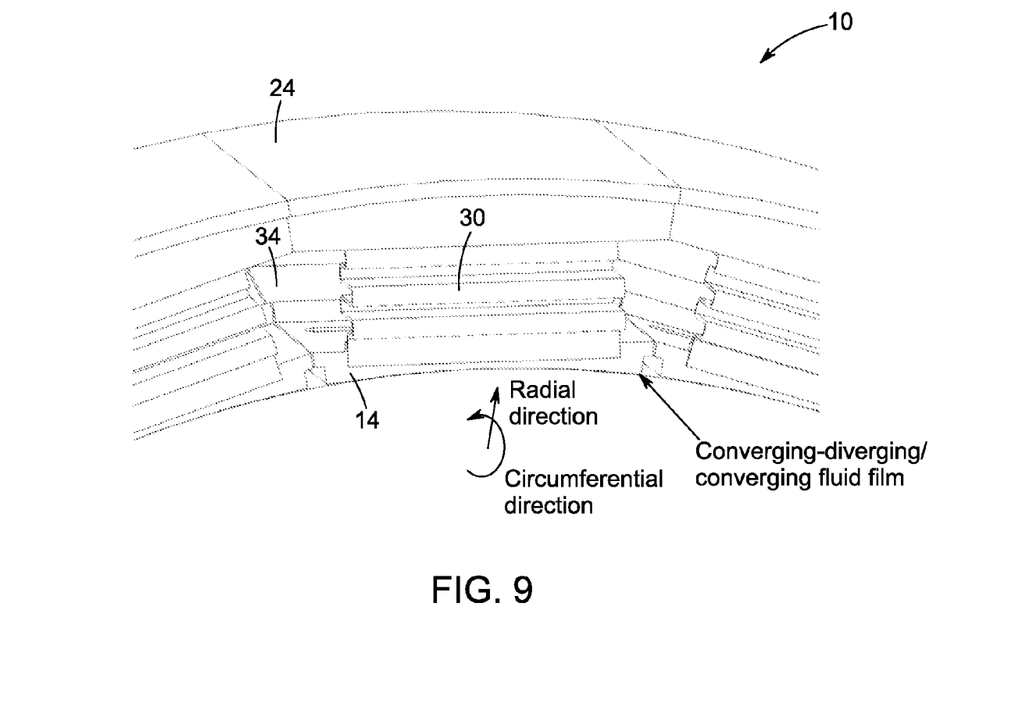
FIG. 9 shows shoe-rotor curvature in an aerodynamic seal assembly in accordance with an embodiment of the present invention.

FIG. 9 shows shoe-rotor curvature in the aerodynamic seal assembly 10 in accordance with an embodiment of the present invention. The seal assembly 10 also operates in an aerodynamic mode of operation. When the rotor-shoe plate gap starts reducing (e.g. during a thermal or mechanical transient event causing clearance change), the thin fluid film starts building additional pressure. In this embodiment, the radius of curvature of the shoe plate 14 is intentionally larger than the rotor radius. As a consequence, when the rotor-shoe plate gap becomes small (less than $1/1000$ inch), the fluid film is either monotonically converging or converging-diverging in the direction of rotation. This fluid film in a form of fluid wedge causes additional pressure to build-up. The physics of thin film is well understood from hydrodynamic journal bearings or foil bearings, and can be modeled using appropriate fluid flow models. The basic principle is that any negative gradient in the fluid film thickness in the direction of rotation will increase the pressure in the fluid film above its boundary pressure. The additional pressure caused by the thin fluid film squeezes the bellow springs 30, 32, thereby, moving the shoe plate 14 radially outwards and keeping the rotor from contacting the shoe plate 14. In this sense, any outward excursion of the rotor is tracked by the shoe plate 14 on every sealing device segment 12.

Figure 10:
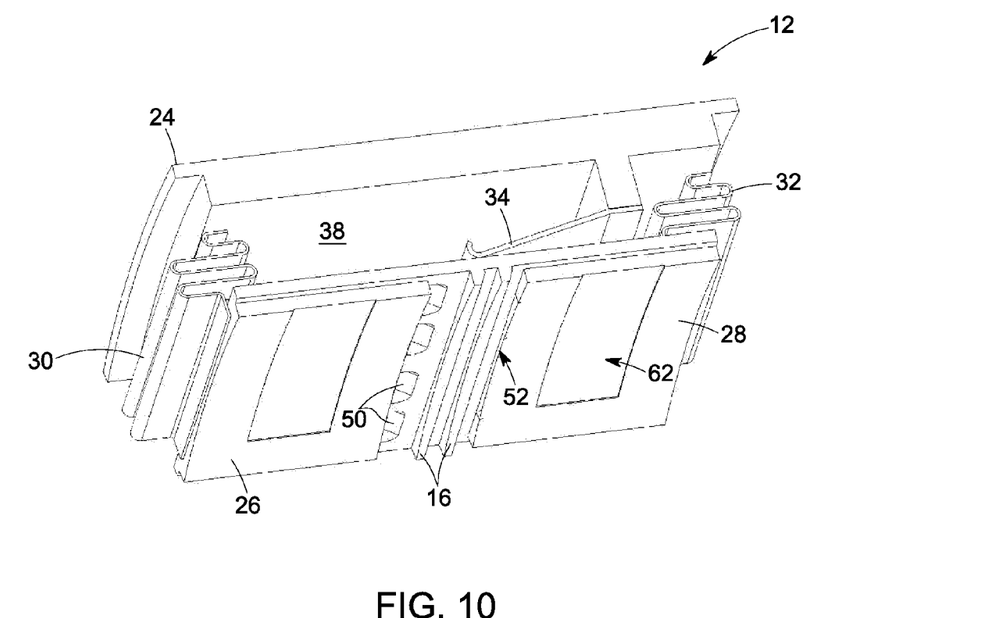
FIG. 10 shows Rayleigh steps in a sealing device segment in accordance with an embodiment of the present invention.

In another embodiment as shown in FIG. 10, the thin fluid film generates additional force due to the presence of one or more Rayleigh steps 60, 62 on the shoe plate 14 in the direction of rotation. As shown, the forward shoe section 26 includes a first Rayleigh step 60 and the aft shoe section 28 includes a second Rayleigh step 62. It should be noted that the multiple forward ports 50 and one or more aft ports 52 also serve the purpose as cooling ports for carrying away the additional heat that might be generated in the thin film aerodynamic mode of seal operation. The presence of two shoes sections, i.e. forward shoe section 26 and the aft shoe section 28 allows the generation of aerodynamic moments (about the circumferential axis) in both directions. For example, if the shoe plate 14 is tilted such that an aft edge of the aft shoe section 28 is closer to the rotor than the forward edge of the forward shoe section 26, then the aft shoe section 28 will generate more aerodynamic force than the forward shoe section 26 and the resulting aerodynamic moment will correct the tilt of the shoe. Similarly, the forward shoe section 26 allows for aerodynamic tilt correction in the event that the forward shoe section 26 is closer to the rotor. Overall, a two shoe plate section arrangement with curvature mismatch with the rotor or one or more Rayleigh steps 60, 62 allows for self-correcting seal behavior that can correct not only radial clearance changes but also forward-aft tilts in the seal.

In a non-limiting example, both the bellows springs 30, 32 and the secondary seal 34 (as shown in FIG. 2) are formed from high temperature metal alloy shims like Inconel X750 or Rene41. Both ends of the bellow springs 30, 32 are brazed to the top interface element 24 and the shoe plate 14. The secondary seal 34 is cantilevered (brazed) to the stator or top interface element 24 and free to slide axially on the shoe plate surface. In the present embodiment, the free end of the secondary seal 34 touches the shoe plate 14 (as shown) and remains in contact with the shoe plate 14 at all times. In one embodiment, there may be a gap (no-contact) between the secondary seal 34 and the shoe plate 14 before pressurization, and this gap will close upon pressurization to establish a contact between the secondary seal 34 and the shoe plate 14. In one embodiment, the shoe plate 14 and the stator interface piece or the top interface element 24 are machined or cast. In one embodiment, the radially innermost surface of the shoe plate may be coated with lubricating coatings like NASA PS304 or NASA PS400 or a similar solid-lubricant coating that can handle unintentional rubs between the shoe plate 14 and the rotor at the seal operating environment conditions. In another embodiment, the rotor surface interfacing with the shoe plate 14 may be coated with Chromium carbide or Titanium aluminum Nitride or similar coatings to improve the rotor's hardness, corrosion resistance and ability to maintain good surface finish.

Figure 11:
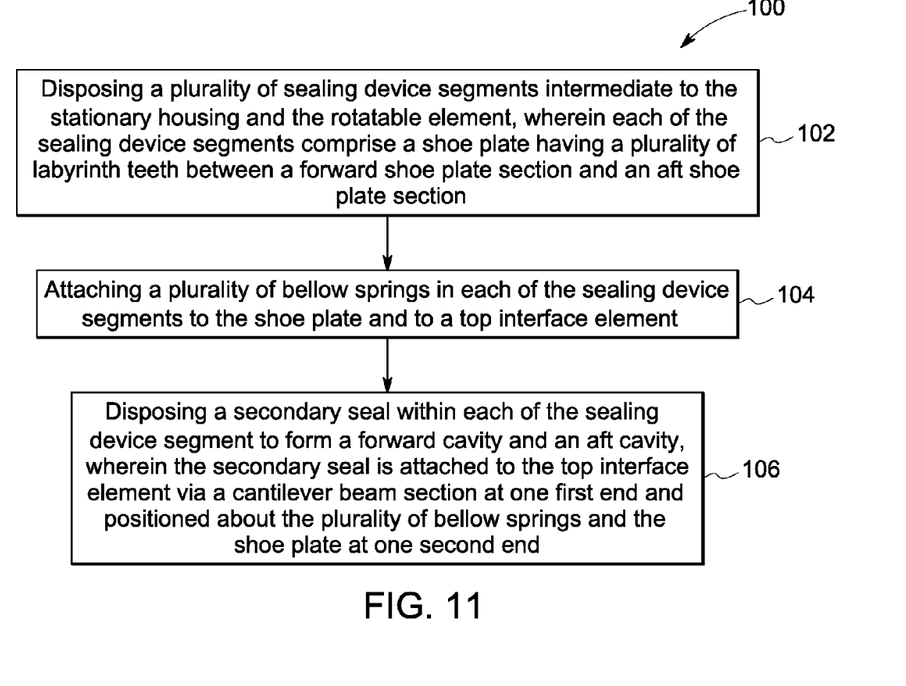
FIG. 11 is flow chart illustrating exemplary steps involved in method of forming an aerodynamic seal between a stationary housing of a rotary machine and a rotatable element turning about an axis of the rotary machine in accordance with an embodiment of the present invention.

FIG. 11 is flow chart 100 illustrating steps involved in method of forming an aerodynamic seal between a stationary housing of a rotary machine and a rotatable element turning about an axis of the rotary machine in accordance with an embodiment of the present invention. At step 102, the method includes disposing multiple sealing device segments intermediate to the stationary housing and the rotatable element, wherein each of the sealing device segments include a shoe plate having multiple labyrinth teeth between a forward shoe plate section and an aft shoe plate section. The shoe plate further includes a forward shoe feeding groove and an aft shoe feeding groove at sides of the shoe plate towards a high pressure side and a low pressure side respectively. At step 104, the method includes attaching a plurality of bellow springs in each of the sealing device segments to the shoe plate and to a top interface element. Finally, at step 106, the method includes disposing a secondary seal within each of the sealing device segment to form a forward cavity and an aft cavity, wherein the secondary seal is attached to the top interface element via a cantilever beam section at one first end and positioned about the plurality of bellow springs and the shoe plate at one second end.

Advantageously, the present aerodynamic seal assemblies are reliable, robust seal for several locations in rotating machinery with high pressure drops and large transients. The seal assemblies are also economical to fabricate. The non-contact operation of the seals makes them especially attractive for the large rotor transient locations. Furthermore, the present invention allows independent controlling of the spring stiffness and the pressure resisting capability (because the springs are not pressure-loaded), thereby allowing the design of compliant seals that still withstands high pressure drops. Furthermore, the present invention allows for a shoe plate to remain parallel to the rotor in aerostatic operation and translate parallel to the rotor during the aerodynamic mode. The present invention also includes improved predictability for the radial motion (increased predictability for leakage performance and robustness).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An aerodynamic seal assembly for a rotary machine, the seal assembly comprising:
   a plurality of sealing device segments disposed circumferentially intermediate to a stationary housing and a rotor, wherein each of the segments comprises:
      a shoe plate with a forward-shoe section and an aft-shoe section having a plurality of labyrinth teeth therebetween facing the rotor, wherein the shoe plate is configured to allow a high pressure fluid to a front portion of the plurality of the labyrinth teeth and a low pressure fluid behind the plurality of the labyrinth teeth and further configured to generate an aerodynamic force between the shoe plate and the rotor;
      a plurality of flexures connected to the shoe plate and to a top interface element, wherein the plurality of flexures are configured to allow the high pressure fluid to occupy a forward cavity and the low pressure fluid to occupy an of cavity; and
      a secondary seal attached to the top interface element via a cantilever beam section at one first end and positioned about the plurality of flexures and the shoe plate at one second end, wherein the secondary seal forms a line contact with the shoe plate at the one second end such that a forward flexure and an aft flexure are located symmetrically on either side of the line contact between the secondary seal and the shoe plate.

2. The aerodynamic seal assembly of claim 1, wherein the shoe plate comprises a forward shoe feeding groove formed due to different circumferential width of a top portion of the shoe plate and the forward shoe plate section towards a high pressure side of the rotary machine.

3. The aerodynamic seal assembly of claim 1, wherein the shoe plate comprises an aft shoe feeding groove formed due to different circumferential width of the top portion of the shoe plate and the of shoe plate section towards a low pressure side of the rotary machine.

4. The aerodynamic seal assembly of claim 1, wherein the plurality of flexures comprises a plurality of bellow springs and each of the plurality of bellow springs comprises a circumferential width less than each of circumferential widths of the top interface element and the shoe plate.

5. The aerodynamic seal assembly of claim 4, wherein the plurality of bellow springs comprises a forward bellow spring and an aft bellow spring.

6. The aerodynamic seal assembly of claim 1, wherein the shoe plate comprises of a plurality of forward ports located before a line of contact at a high pressure side of the rotary machine for allowing an axial flow of a fluid to a from portion of the plurality of the labyrinth teeth.

7. The aerodynamic seal assembly of claim 6, wherein the plurality of the forward ports are angled in a circumferential direction to impart the fluid to swirl as the fluid flows from the forward cavity to a front portion of the plurality of labyrinth teeth.

8. The aerodynamic seal assembly of claim 7, wherein the forward cavity is formed by the top interface element, the secondary seal, the forward bellow spring and the shoe plate at a high pressure side of the rotary machine.

9. The aerodynamic seal assembly of claim 1, wherein the shoe plate comprises one or more aft ports located after a line of contact at a low pressure side of the rotatary machine and configured to connect a backside of the plurality of labyrinth teeth to the aft cavity.

10. The aerodynamic seal assembly of claim 9, wherein the aft cavity is formed by the top interface element, the secondary seal, the aft bellow spring and the shoe plate at a low pressure side of the rotary machine.

11. The aerodynamic seal assembly of claim 9, wherein the one or more aft ports are angled in a circumferential direction to impart a tangengial flow to a fluid flowing from behind the plurality of the labyrinth teeth into the aft cavity.

12. The aerodynamic seal assembly of claim 9, wherein the one or more aft ports are straight ports or circumferential angled ports for allowing a flow of fluid from behind the plurality of the labyrinth teeth to a downstream cavity of the sealing device segment.

13. The aerodynamic seal assembly of claim 1, wherein each of the forward-shoe section and the aft-shoe section comprises a Rayleigh step for generating a thin film for an additional upward thrust on the sealing device segment.

14. The aerodynamic seal assembly of claim 1, wherein a side of the shoe plate facing the rotor comprises a radius of curvature different from radius of curvature of the rotor.

15. The aerodynamic seal assembly of claim 14, wherein the radius of curvature of the side of the shoe plate facing the rotor is more than the radius of curvature of the rotor.

16. An aerodynamic sealing device for turbine components, comprising:
a shoe plate having a plurality of labyrinth teeth between a forward shoe plate section and an aft shoe plate section facing a rotatable element, wherein the shoe plate is configured to allow a high pressure fluid to a front portion of the plurality of the labyrinth teeth and a low pressure fluid behind the plurality of the labyrinth teeth and further configured to generate an aerodynamic force between the shoe plate and the rotor;
a plurality of flexures connected to the shoe plate and to a top interface element, wherein the plurality of flexures are configured to allow the high pressure fluid to occupy a forward cavity and the low pressure fluid to occupy an aft cavity; and
a secondary seal connected to the top interface element via a cantilever beam section at one first end and positioned about the plurality of flexures and the shoe plate at one second end, wherein the secondary seal forms a line contact with the shoe plate at the one second end such that a forward flexure and an aft flexure are located symmetrically on either side of the line contact between the secondary seal and the shoe plate and wherein the secondary seal is disposed within the sealing device to form the forward cavity and the aft cavity towards a high pressure side and a low pressure side of the rotary machine.

17. The aerodynamic sealing device of chum 16, further comprising a forward shoe feeding groove and an of shoe feeding groove at sides of the shoe plate towards a high pressure side and a low pressure side of the rotary machine respectively.

18. The aerodynamic sealing device of claim 16, wherein the plurality of flexures comprises a plurality of bellow springs and each of the plurality of bellow springs comprises a circumferential width less than each of circumferential widths of the top interface element and the shoe plate.

19. The aerodynamic sealing device of claim 16, further comprising a plurality of forwards ports located in the forward cavity and one or more aft ports located in the aft cavity.

* * * * *